Aug. 21, 1951  F. C. HAMMICK  2,565,368
INTERNAL-COMBUSTION ENGINE
Filed Nov. 15, 1948  12 Sheets-Sheet 1

Inventor
F. C. Hammick
By
C. F. Wenderoth
Attorney

Aug. 21, 1951  F. C. HAMMICK  2,565,368
INTERNAL-COMBUSTION ENGINE
Filed Nov. 15, 1948  12 Sheets-Sheet 2

Inventor
F.C. Hammick
By
E.F. Wenderoth
Attorney

Aug. 21, 1951  F. C. HAMMICK  2,565,368
INTERNAL-COMBUSTION ENGINE
Filed Nov. 15, 1948  12 Sheets-Sheet 3
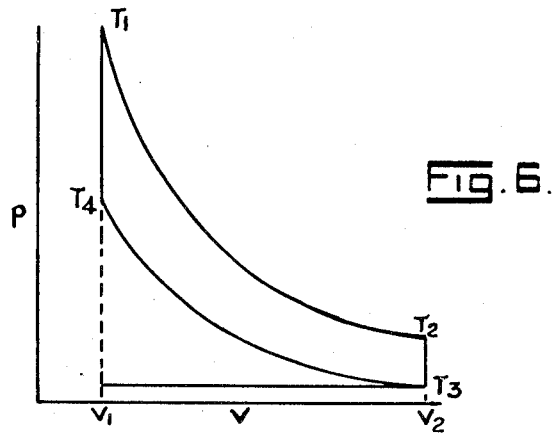
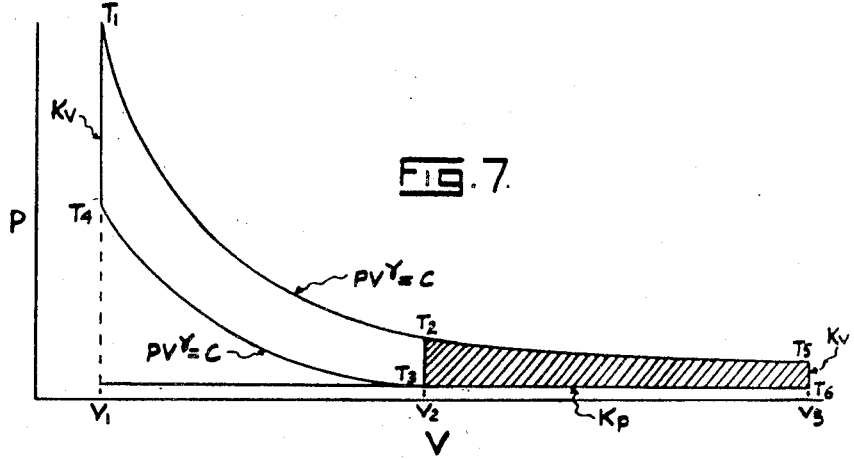
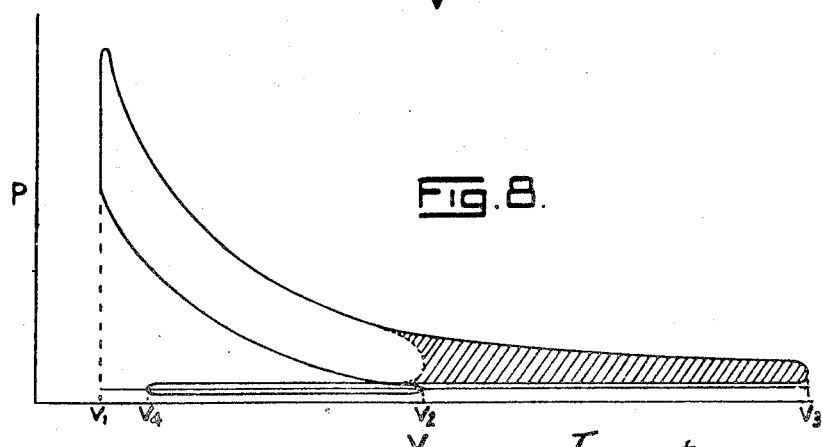
Inventor
F. C. Hammick
By C. F. Wendroth
Attorney Aug. 21, 1951  F. C. HAMMICK  2,565,368
INTERNAL-COMBUSTION ENGINE
Filed Nov. 15, 1948  12 Sheets-Sheet 4

Inventor
F. C. Hammick
By
C. F. Wenderoth
Attorney

Aug. 21, 1951     F. C. HAMMICK     2,565,368
INTERNAL-COMBUSTION ENGINE
Filed Nov. 15, 1948     12 Sheets-Sheet 5
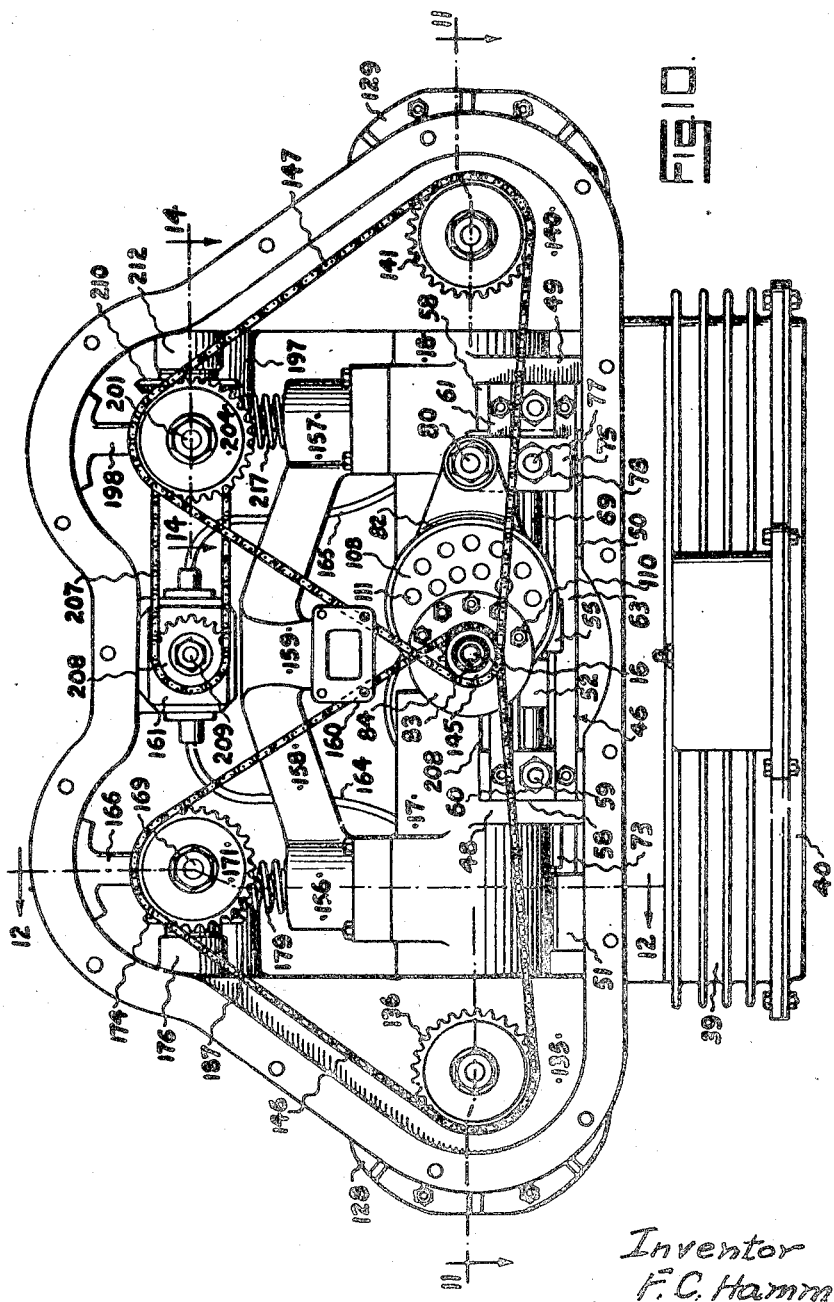
Inventor
F. C. Hammick
By
C. F. Wenderoth
Attorney

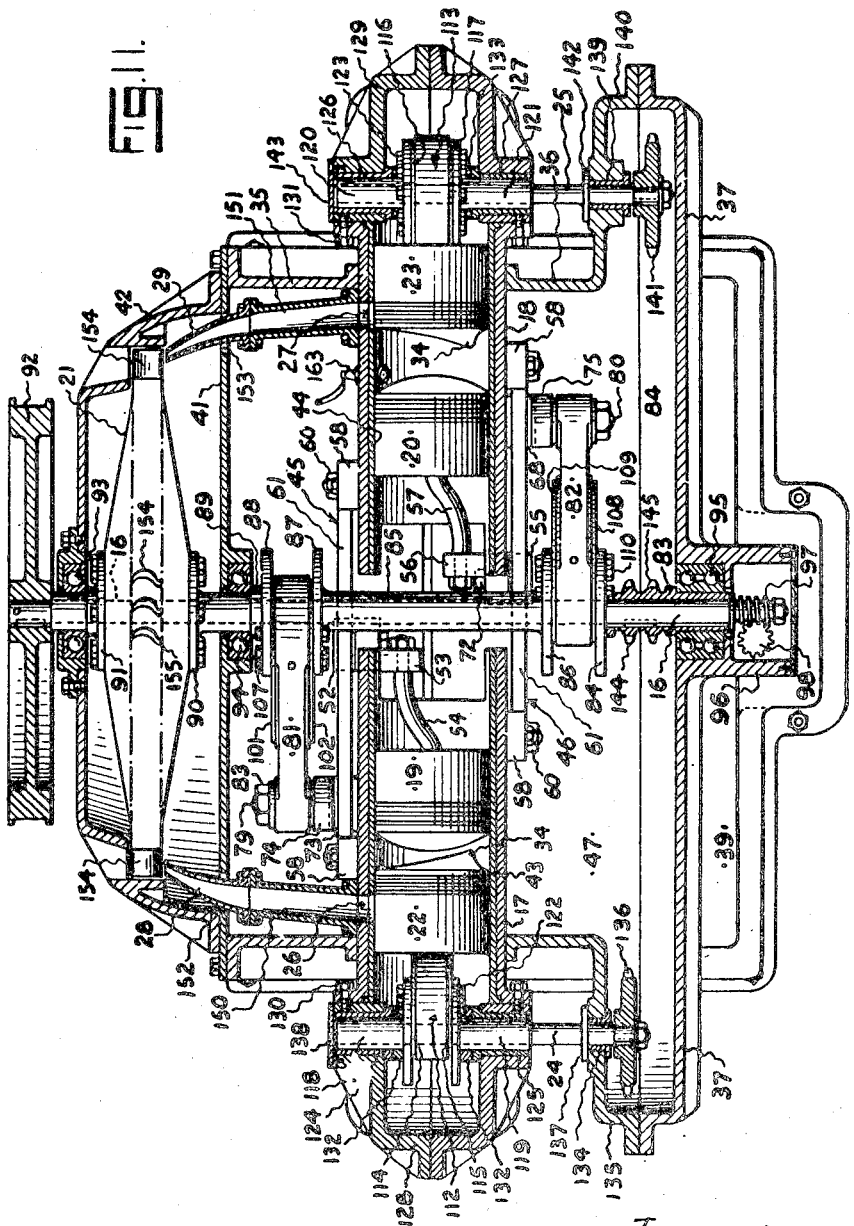

Aug. 21, 1951  F. C. HAMMICK  2,565,368
INTERNAL-COMBUSTION ENGINE
Filed Nov. 15, 1948  12 Sheets-Sheet 9

Inventor
F. C. Hammick
By E. F. Wenderoth
Attorney

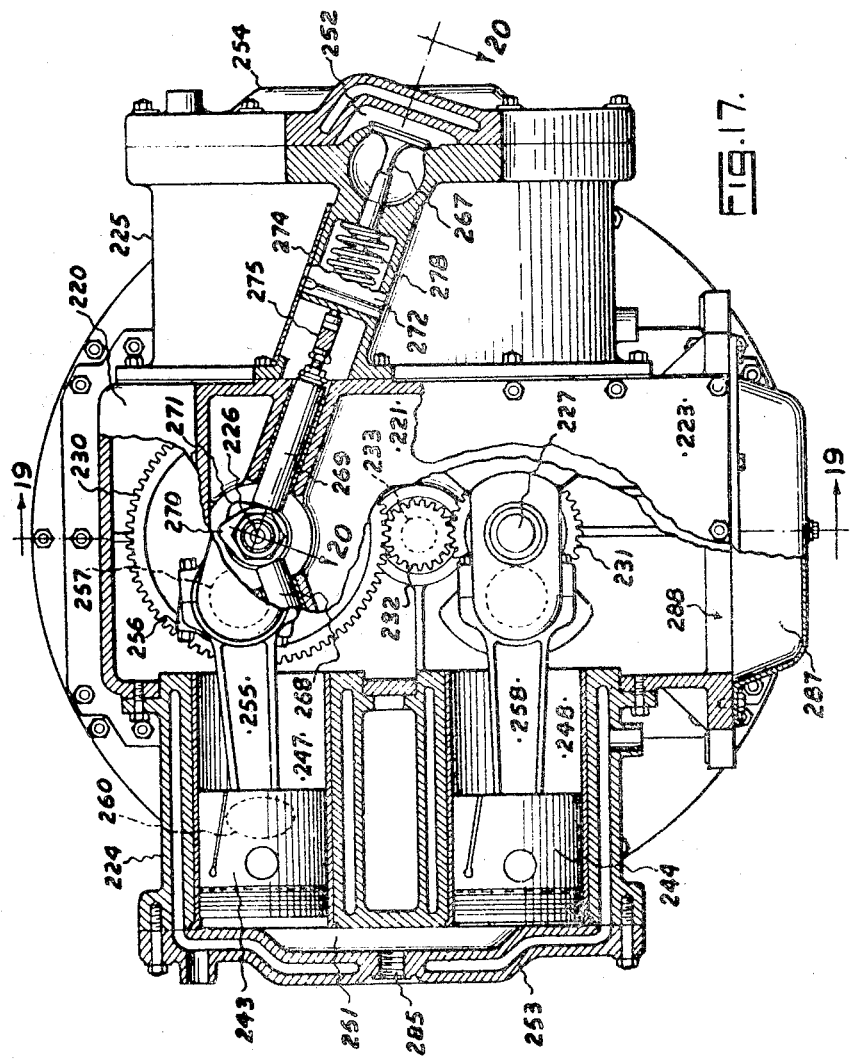

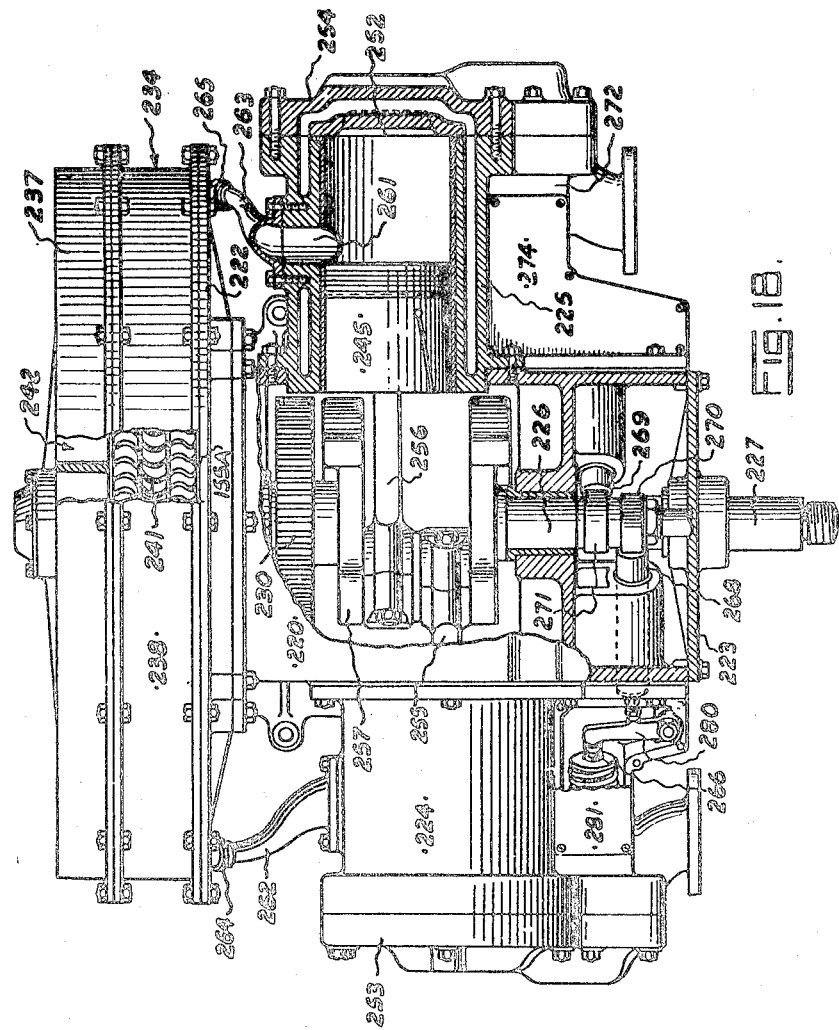

Patented Aug. 21, 1951

2,565,368

UNITED STATES PATENT OFFICE 2,565,368

INTERNAL-COMBUSTION ENGINE

Frederick Charles Hammick, Ivanhoe, near Melbourne, Australia

Application November 15, 1948, Serial No. 60,055
In Australia December 19, 1947

6 Claims. (Cl. 123—51)

This invention relates to internal combustion engines.

An object of this invention is to provide an internal combustion engine in which the amount of heat energy in the fuel utilised in doing work is greater than that utilised in existing engines operating with like ignition means.

A further object is to provide an internal combustion engine having an improved thermal efficiency.

A further object is to provide an internal combustion engine which operates on a cycle in which the swept volumes differ to provide increased output.

A further object is to provide a dual energy internal combustion engine in which the heat in the fuel, available for doing work, is utilised partly as pressure energy and partly as kinetic energy.

A further object is to provide a four stroke cycle internal combustion engine in which the conventional mechanically operated exhaust valve and actuating mechanism therefor is obviated and replaced by an exhaust port.

An engine constructed according to this invention may have any known form of ignition means, and any number of cylinders, which number is limited only by mechanical considerations. The cylinders may be arranged radially, or in in-line opposed pairs, or in adjacent banks of radially disposed cylinders. Other arrangements will be apparent to those skilled in the art.

For the purpose of describing the invention fundamentally, and two practical embodiments thereof, reference will be made to the accompanying drawings wherein:

Fig. 6 is a conventional hypothetical Otto cycle pressure-volume diagram;

Fig. 7 is a hypothetical pressure-volume diagram according to the present invention;

Fig. 8 represents the pressure-volume diagram of Fig. 7 modified to take account of practical considerations;

Fig. 10 is a front elevation of the engine with the front outer cover removed;

Fig. 11 is a sectional plan, taken substantially on the line 11—11 of Fig. 10, with the front cover secured in position;

Fig. 17 is a part sectional elevation of a practical embodiment of the engine shown diagrammatically in Figs. 16, 16A, 16B and 16C;

Fig. 18 is a part sectional plan on the plane of the two stroke crankshaft of the embodiment shown in Fig. 17;

Figure 1:
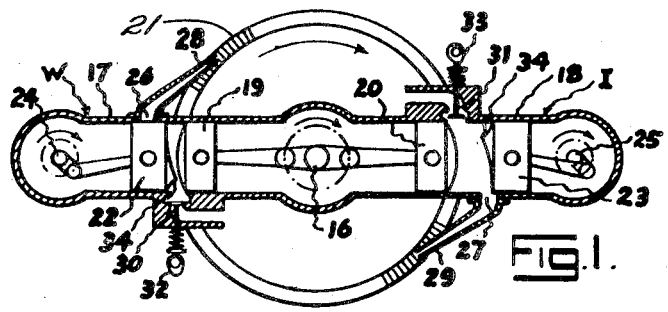
Figs. 1, 1A, 1B and 1C are diagrammtic representations of one embodiment which employs a turbine in the form of a twin opposed coaxial cylinder engine, showing the cycle of events in four stages.
Figure 1A:
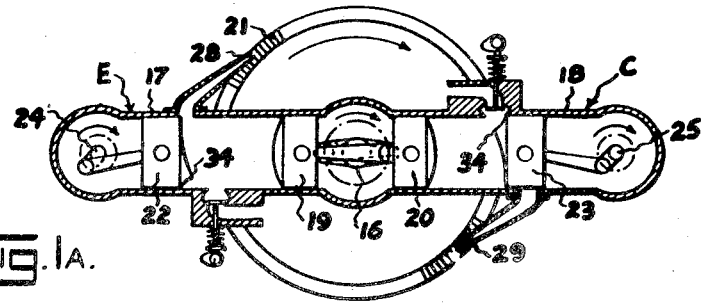
Figure 1B:
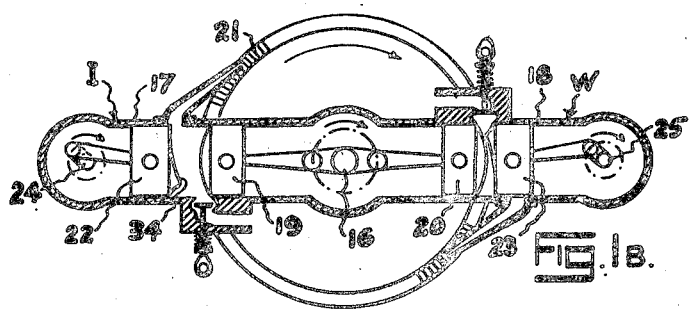
Figure 1C:
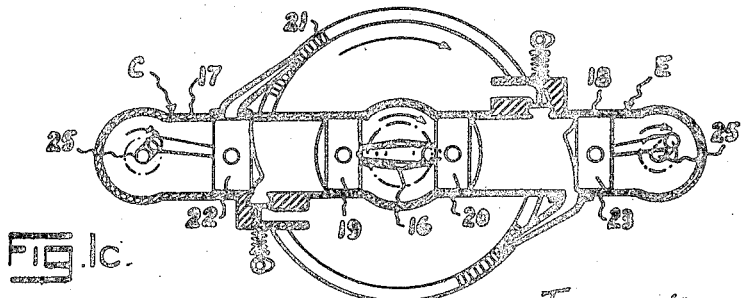

Referring to the diagrammatic representations shown in Figs. 1 to 1C, the engine includes an output shaft 16, two opposed cylinders 17 and 18, two four stroke pistons 19 and 20 connected to the output shaft by means of cranks or eccentrics displaced 180 degrees relative to each other and each located in a respective cylinder, a turbine 21 secured to the output shaft, two two stroke pistons 22 and 23 located in the cylinders 17 and 18 in opposed coaxial disposition to the pistons 19 and 20 respectively, admission means for each cylinder, and exhaust means for each cylinder adapted to direct the gases of combustion into the blades of the turbine. In this embodiment the common combustion chamber for each pair of two and four stroke pistons is located in the respective cylinder. The two stroke pistons 22 and 23 are connected by cranks or eccentrics to two shafts 24 and 25 respectively, which are located at the outer ends of the cylinders, and are so displaced relative to each other that the pistons reciprocate on opposite strokes.

The shafts 24 and 25 are operably connected to the output shaft 16 by any suitable known positive transmission means at a 2:1 reduction so that the output shaft 16 rotates two revolutions for each revolution of the shafts 24 and 25.

In each heat conversion cycle of induction, compression, expansion and exhaust, the output shaft 16 rotates two revolutions and the pistons 19 and 20 reciprocate four strokes in the usual manner while the pistons 22 and 23 reciprocate two strokes.

Owing to the relative displacement of the shafts 24 and 25 and the timing of the admission means, ignition takes place in each cylinder alternately so that during the working stroke in one cylinder, induction takes place in the other cylinder and one working stroke is provided for each revolution of the output shaft.

The relative movements of each pair of four stroke and two stroke pistons having a common combustion chamber is such that the working or expansion stroke volume is greater than the induction stroke volume.

In the embodiment shown in these Figures 1 to 1C the stroke of the two stroke pistons is made less than the stroke of the four stroke pistons for reasons which will become evident later in the description. As shown, for example, the stroke of the two stroke pistons is half that of the four stroke pistons. Exhaust ports 26 and 27 which extend in the cylinder walls axially thereof from a point, for example, half way down the stroke of the two stroke pistons towards the outer end of the stroke, communicate with turbine nozzles 28 and 29 respectively which are directed to the blades of the turbine 21 in well known manner to produce rotation in a desired direction. In Figs. 1 to 1C the direction of rotation of rotating parts is indicated by arrows.

Admission means for the cylinders 17 and 18 comprise, for example, spring loaded poppet valves 30 and 31 which are actuated respectively by cams 32 and 33 driven by the output shaft through suitable 2:1 reduction transmission means.

Figs. 1 to 1C show successively the relative positions of the pistons in each cylinder with the four stroke pistons at either inner or outer dead centre at approximately the beginning of each of the four phases of the heat cycle, namely, working or expansion, exhaust, induction, and compression which are respectively represented by the letters W, E, I and C which are connected by lead lines to the related cylinder.

However, four positions of the pistons as shown in Figs. 1 to 1C are insufficient to clearly indicate the relative movements of two pistons in each cylinder over a cycle. For this reason reference is made to Figs. 2, 3, 4 and 5 which are graphs of linear piston displacement against angular displacement of the output shaft and which clearly indicate the change in volume over the cycle.

Figure 2:
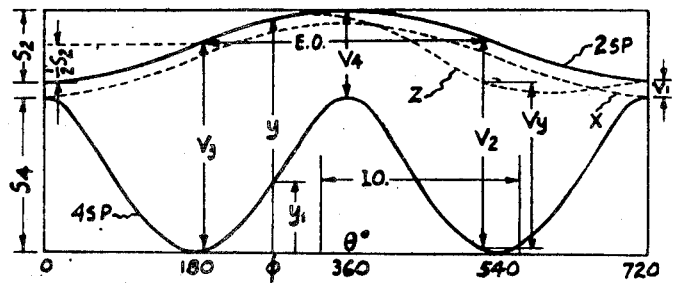
Fig. 2 is a graph of relative piston displacement against angular displacement of the output shaft when the four stroke piston and the two stroke piston are in phase.

Referring to Fig. 2 and considering one cylinder, 2SP is the displacement curve of the two stroke piston and $S_2$ represents its stroke, 4SP is the displacement curve of the four stroke piston and $S_4$ represents its stroke, $\theta$ represents the angular displacement of the output shaft, and $V_1$ between the curves 2SP and X indicates the clearance volume. At $\theta=0°$ the cycle commences on the working or expansion stroke.

The volume of working substance in the cylinder for any angle $\theta=\phi$ of the output shaft is represented by $y-y_1$.

In Fig. 2 both displacement curves are in phase so that both pistons are at inner dead centre at the beginning of the working stroke. Now as the exhaust port is exposed by the two stroke piston when it has travelled a distance in its stroke equal to $\frac{1}{2}S_2$ the exhaust valve opening period can be represented by E. O. An arbitrarily chosen inlet opening period is represented by I. O.

The end of the working stroke is given when the volume represented by $V_3$ in the first half of the cycle is a maximum and this occurs when the corresponding gradients of the curves 2SP and 4SP are equal, the angular displacement $\theta$ then being a little more than 180°.

The clearance volume at the end of the exhaust stroke when $\theta=360°$ is represented by $V_4$, the exhaust stroke swept volume being given by $V_3-V_4$.

The induction stroke volume is given by $V_2$ in the second half of the cycle and is a maximum slightly before $\theta=540°$ when the corresponding gradients of the curves 2SP and 4SP are equal.

The theoretical induction stroke swept volume is given by $V_2-V_4$ and the theoretical compression ratio, assuming no scavenging of $V_4$, is given by $$\frac{V_2}{V_1}$$

The ratio of expansion to induction $$\frac{V_3}{V_2}$$

is unity when the pistons are in phase, as in Fig. 2, and when no scavenging of $V_4$ is effected. This ratio is increased by either displacing the curve 2SP in advance of the curve 4SP, which means that the pistons are timed so that the two stroke piston leads the four stroke piston, or by scavenging part or all of the residual gas volume $V_4$ so that the induction stroke volume $V_2$ tends towards a value $V_y$ less than $V_3$, or by a combination of both these methods. Scavenging can be represented by the dotted curve Z to replace the corresponding part of the curve 2SP.

Figure 3:
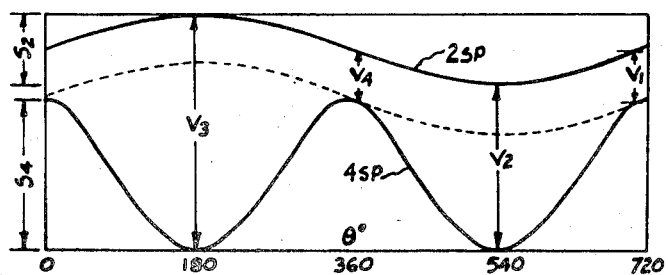
Fig. 3 is a graph similar to that of Fig. 2 showing the displacement curve of the two stroke piston out of phase with and in advance of the four stroke piston displacement curve.

Considering the first method the optimum displacement of the curve 2SP is 180° in advance of the curve 4SP as shown in Fig. 3. However, in this position the exhaust opening, if an exhaust port exposed by the two stroke piston were used, would extend symmetrically over the expansion and exhaust strokes so that if the exhaust were to close at 360° at the end of the exhaust stroke, the exhaust would open at inner dead centre. Therefore, when the timing of Fig. 3 is used, a conventional mechanically operated exhaust valve which functions independently of the two stroke piston is employed so that the valve timing may be varied as desired.

It will be noted that if such a valve is employed the two stroke piston may be advanced beyond 180° in order to reduce the residual gas volume $V_4$ to a value less than the initial clearance volume $V_1$. However, the amount of advance beyond 180° is limited by the desired compression ratio and ratio of expansion to induction.

This timing arrangement of the two and four stroke pistons has the advantage that the clearance volume $V_1$ at the beginning of the expansion stroke and the clearance volume $V_4$ at the end of the exhaust stroke are the same and scavenging of excess residual gas is obviated, but it has the disadvantage that the maximum compression ratio $$\frac{V_2}{V_1}$$

is reduced unless the pistons are provided with suitable projections which extend alternately into the stroke of the other piston.

Figure 4:
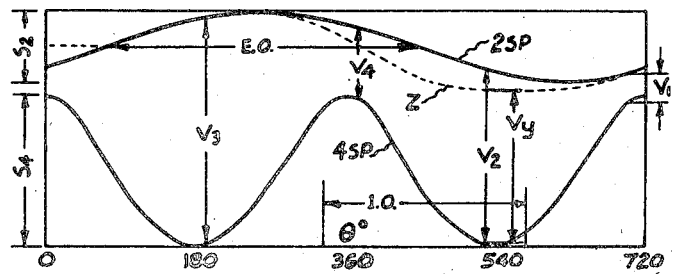
Fig. 4 is a graph similar to that of Fig. 3 showing the displacement curve of the two stroke piston in advance of the four stroke piston displacement curve an amount providing a maximum expansion-induction ratio.
Figure 5:
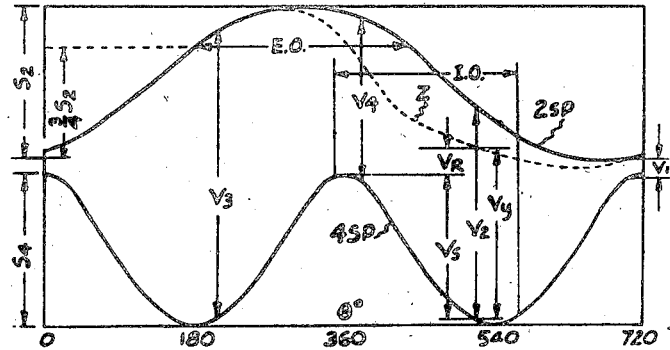
Fig. 5 is a further displacement graph showing the curves slightly out of phase and the swept volumes of each piston equal.
Figure 9:
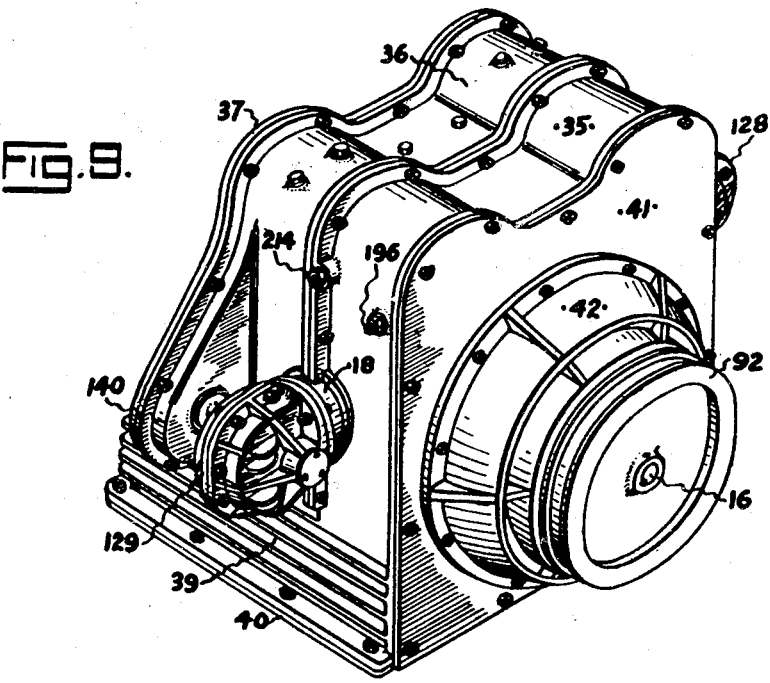
Fig. 9 is a perspective view of a practical embodiment of the engine shown diagrammatically in Figs. 1, 1A, 1B and 1C.
Figure 14:
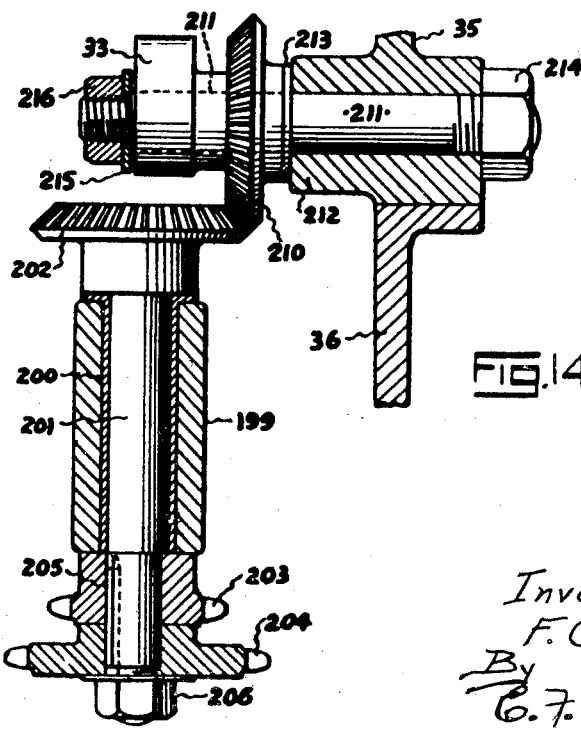
Fig. 14 is an enlarged sectional plan on the plane indicated by the line 14—14 of Fig. 10.

Compromise timings of the two and four stroke pistons, which obviate the use of a mechanically operated exhaust valve and enables a port to be employed, are shown in Figs. 4 and 5 and will be described respectively with reference to the two embodiments illustrated, both of which employ turbines which function both as torque producers and scavengers.

A comparison between the hypothetical indicator diagrams of an engine operating on the conventional Otto cycle and an engine constructed according to the present invention and functioning with constant volume heating is provided in Figs. 6 and 7.

According to the present invention the gas continues its expansion beyond volume $V_2$ to a greater volume $V_3$ the value of which depends on the relative movement and swept volumes of the two and four stroke pistons and on scavenging, if utilised.

Referring to Fig. 7, the theoretical cycle of operations can be given as follows: heating at constant volume from $T_4$ to $T_1$, adiabatic expansion from $T_1$ to $T_5$, cooling at constant volume from $T_5$ to $T_6$, cooling at constant pressure from $T_6$ to $T_5$ and adiabatic compression from $T_3$ to $T_4$.

If the compression ratio is given by $$\frac{V_2}{V_1} = r$$

the ratio of expansion to induction by $$\frac{V_3}{V_2} = \omega$$

and the exhaust ratio by $$\frac{T_5}{T_6} = \alpha$$

then it can be shown that the theoretical thermal efficiency, or air standard efficiency is given by $$\eta = 1 - \frac{\omega(\alpha-1) + \gamma(\omega-1)}{r^{\gamma-1}(\alpha\omega^\gamma - 1)}$$

Where $\gamma$ is equal to the ratio of specific heats $$\frac{K_P}{K_V}$$

If $\omega=2$, $\alpha=5$ and $r=6$ the increase in efficiency of the above cycle above that of the Otto cycle is approximately 22%. However, in the present engine, if an exhaust port is employed, the absence of a hot exhaust valve head in the combustion chamber enables the compression ratio to be raised above the normal maximum.

If the compression ratio in the present engine is raised to a value of 8 then the increase in efficiency is approximately 30%.

The cross hatched area in Fig. 7 indicates the theoretical increase in work done. In practice, however, this area is increased, as shown in Fig. 8, by saving the greater portion of that work lost owing to early exhausting at a comparatively high pressure. Fig. 8 is drawn for the case where $V_4$ is greater than $V_1$.

Fig. 4 shows the relative positions of the pistons over a cycle when the two stroke piston leads the four stroke piston by an amount of 110° relative to the output shaft.

This arrangement was found to be an optimum timing for ¾ load in an engine having four radially disposed cylinders and a turbine.

As shown in Fig. 4, the exhaust opens to the turbine approximately 60° after inner dead centre of the four stroke piston during the working stroke and closes approximately 80° after inner dead centre on the exhaust stroke.

The overlap of the exhaust and inlet openings in the embodiment of Figs. 1 to 1C is offset by the use of a deflector type crown 34 on the two stroke pistons and by arranging the ports in a manner which will be further described with reference to Figs. 9 to 15.

It will be observed that the exhaust opening and closing points in each cylinder may be varied an equal amount to reduce or increase the opening period by varying the effective length of the port axially of the cylinder from the bottom or outer dead centre position of the crown end of the two stroke piston.

It will also be observed that in advancing the two stroke piston relative to the four stroke piston the clearance volume $V_1$ is increased. However, it may be reduced to a desired amount as well known by altering, for example, the crown of the four stroke piston. The working stroke begins slightly before 720° where the corresponding gradients of the curves 2SP and 4SP are equal.

The comparatively early exhaust opening point provides a heat drop, through the turbine nozzle, which is greater than would be the case of exhausting, through a turbine nozzle, the residual gases of combustion of a conventional four stroke engine. In the present engine, the heat energy in the fuel, which is available for doing work, is transformed partly as pressure energy and partly as kinetic energy and both forms of energy are utilised in doing work on three elements, namely the two stroke and four stroke pistons and the turbine, all of which are operably connected to the output or torque shaft.

Although the diagram in Fig. 8 represents work done due to pressure energy, it is not indicative of the actual conditions provided by the timing arrangement of Fig. 4 in an engine embodying a turbine, as portion of the heat would be utilised as kinetic energy doing work on the turbine and this would affect the actual P. V. diagram although the work done which is represented by the area of the diagram is comparable.

The work done by kinetic energy in the turbine is determined only by subtracting the indicated horse power of the piston portion of the engine from the total shaft output.

As the thermal efficiency computed in tests provided an actual increase greater than that given by the theoretical air standard efficiency, it is suggested that such increase is due to either a higher relative efficiency or a more effective utilisation of the heat available, in the form of kinetic energy in the turbine.

Referring now in general to Figs. 9 to 15, the reference numerals employed in Figs. 1 to 1C will again be employed to indicate corresponding parts.

In this particular construction, which is adapted to function in accordance with the timing of Fig. 4, eccentrics are employed to convert linear motion to rotary motion or vice versa with respect to the pistons and shafts.

The outer casing of the engine (Fig. 9) comprises a rear casing 35, a front casing 36, a front cover plate 37, a sump housing 39 integral with the rear casing and extending beneath the front casing, a bottom cover 40 for the sump housing, a rear cover plate 41, and a turbine housing 42. All the parts of the outer casing are detachably secured together in their relative positions as shown by bolts, screws, studs and nuts or like means as well known.

The cylinders 17 and 18 (Figs. 10 and 11) are provided with liners 43 and 44 respectively and are detachably connected together on one side by a cross-head guide assembly 45, and on the other side by a similar assembly 46. The cylinders extend between and through apertures formed between the sides of the front and rear casings 36 and 35 and each cylinder is secured at one point only to the floor 47 of the front casing 36, cylinder 17 being secured by a bolt passing through the floor of the front casing and screwed into a face-block 48 (Fig. 10) integral with the cylinder, and cylinder 18 being similarly secured by a bolt screwed into a face-block 49. The face-blocks 48 and 49 provide means for securing the cross-head guide assembly 46 to the cylinders.

Figure 12:
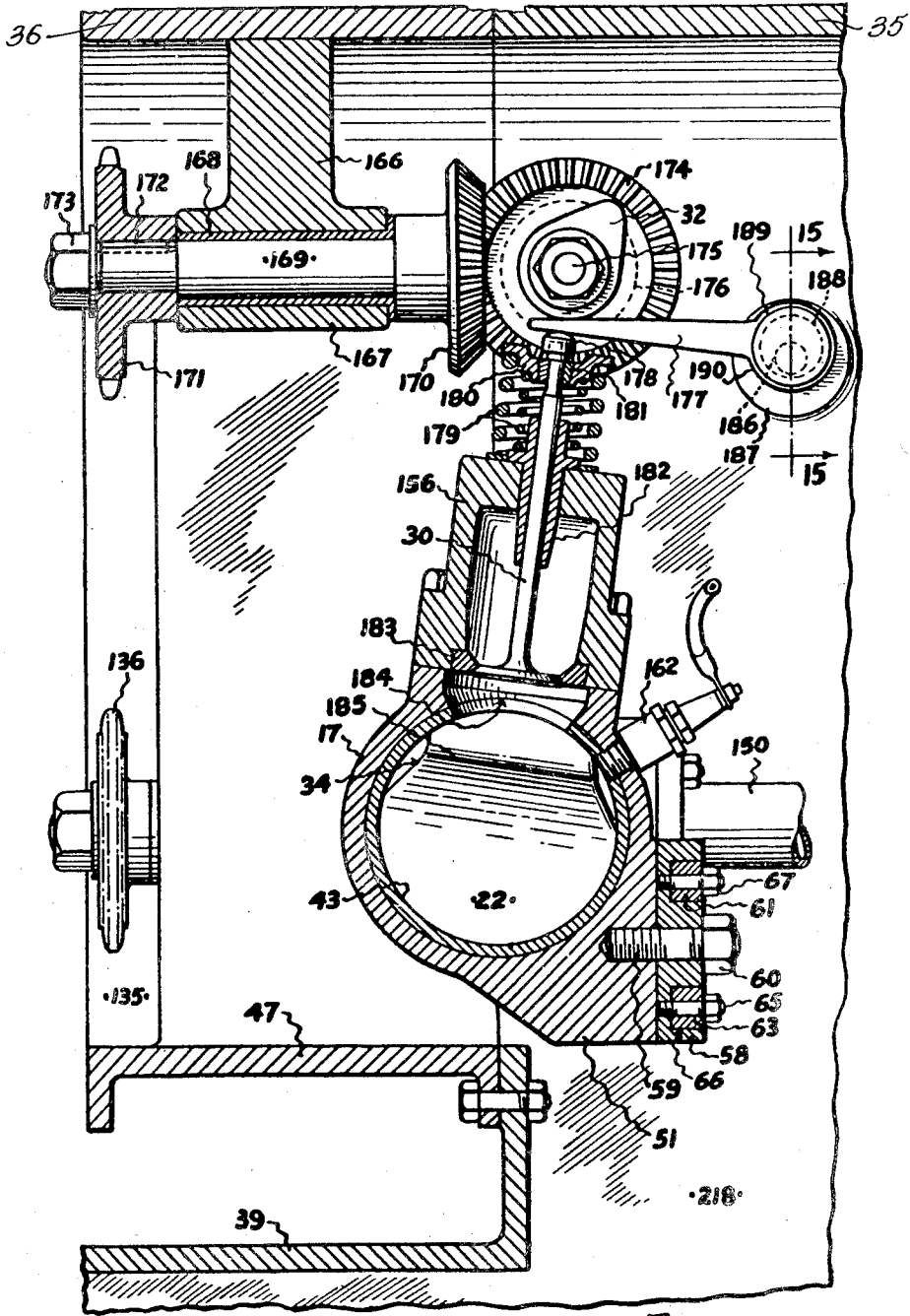
Fig. 12 is an enlarged sectional elevation taken substantially on the line 12—12 of Fig. 10.
Figure 15:
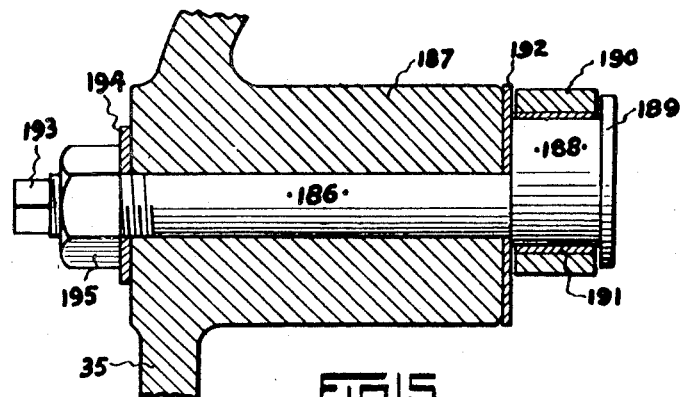
Fig. 15 is an enlarged sectional elevation taken on the line 15—15 of Fig. 12.

Additional face-blocks 50 and 51, corresponding to the face-blocks 48 and 49, are provided integral with and on the opposite sides of the cylinders 18 and 17 respectively, to provide means only for securing the cross-head guide assembly 45 thereto. The face-blocks 50 and 51 extend over the opening between the rear casing 35 and the sump housing 39 (Fig. 12).

The face-blocks are so disposed that the cross-head guide assemblies are symmetrically offset with respect to each other so that the assembly 45 has a major portion thereof located adjacent to the cylinder 17 and the assembly 46 has a major portion thereof located adjacent the cylinder 18.

The assembly 45 has slidably mounted therein, a cross-head slider member 52 having a sidewardly extending block 53 bolted thereto to which one end of an irregular shaped piston rod 54 is positively but detachably secured to prevent relative movement.

The other end of the piston rod is provided with a holed boss and carries therein a gudgeon pin which pivotally secures the piston 19 thereto in the cylinder 17.

The assembly 46 has slidably mounted therein a cross-head slider member 55 having a sidewardly extending block 56 bolted thereto which is similarly connected to the piston 20 in the cylinder 18 by means of a piston rod 57.

Each cross-head guide assembly comprises two mounting-blocks 58 (Figs. 11, 12 and 13) each secured to a respective face-block of one cylinder by means of a stud 59 and a nut 60, an upper guide rail 61 having a V-face wear strip 62 secured thereto, and a lower guide rail 63 having a V-face wear strip 64 secured thereto, each guide rail being fitted at each end on studs 65 in recesses 66 in the mounting-blocks and secured by nuts 67.

The cross-head in the guide assembly 46 comprises two spaced slider members 55 and 68 fitted between and shaped complementary to the wear strips 62 and 64 and connected together by a rod 69. The top and bottom side edges of each slider member are chamfered as at 70.

Each of the blocks 53 and 56 has a shallow V-shaped recess as at 71 (Fig. 13) and fits over the inner side face of, on a stud extending from the inner side of the related one of the slider members 52 and 55, and is secured by a nut as indicated at 72.

The cross-head in the guide assembly 45 comprises the slider member 52 and a slider member 73 which are also connected together by a rod corresponding to the rod 69 located between the upper and lower guide rails of the assembly 45.

Two connecting blocks 74 and 75 are each provided with a shallow V-shaped recess, as indicated at 76 with respect to the block 75 (Fig. 13), by means of which they are fitted on the outer faces of the slider members 73 and 68 respectively and each is secured by a stud 77 and nut 78 (Fig. 10).

Flanged journal pins 79 and 80 are fixedly secured to and extend outwardly from the connecting blocks 74 and 75 and have pivotally mounted thereon the small ends of eccentrics 81 and 82 which are retained on the pins by nuts 83 and 84 respectively.

The output shaft 16 is in effect a torque shaft which extends from the front to the rear of the engine through a sprocket sleeve 83, an eccentric retaining plate 84, the eccentric 82, a connecting sleeve 85 having end flanges 86 and 87, the eccentric 81, an eccentric retaining plate 88 having a spigot 89, and the turbine 21 which includes flanged bearing sleeves 90 and 91.

The power output of the engine is transmitted from the output shaft 16 through suitable means, for example a pulley 92 which is secured to the shaft adjacent to the turbine housing 42.

The output shaft is keyed to the sprocket sleeve 83, the connecting sleeve 85, and the flanged bearing sleeves 90 and 91 of the turbine so that relative rotation is prevented.

The members mounted on the output shaft 16 are supported, and restrained against movement axially, by anti-friction races 93, 94 and 95 which are mounted in the turbine housing 42, the rear cover plate 41 and the front cover plate 37 respectively.

The front cover plate 37 is provided with an integral housing 96 in which are located the race 95, a worm 97 and a worm wheel 98. The worm is flanged and keyed on the end of the output shaft 16 and together with the pulley 92 restrains the output shaft against movement axially with respect to the members mounted thereon and located between the races 93 and 95. The worm wheel 98 is operably connected to and drives an oil pump which may be of any suitable type and which is secured to the underside of the housing 96 and feeds lubricant from the sump housing 39, located directed beneath, to the various bearing surfaces in a manner obvious to those skilled in the art.

Figure 13:
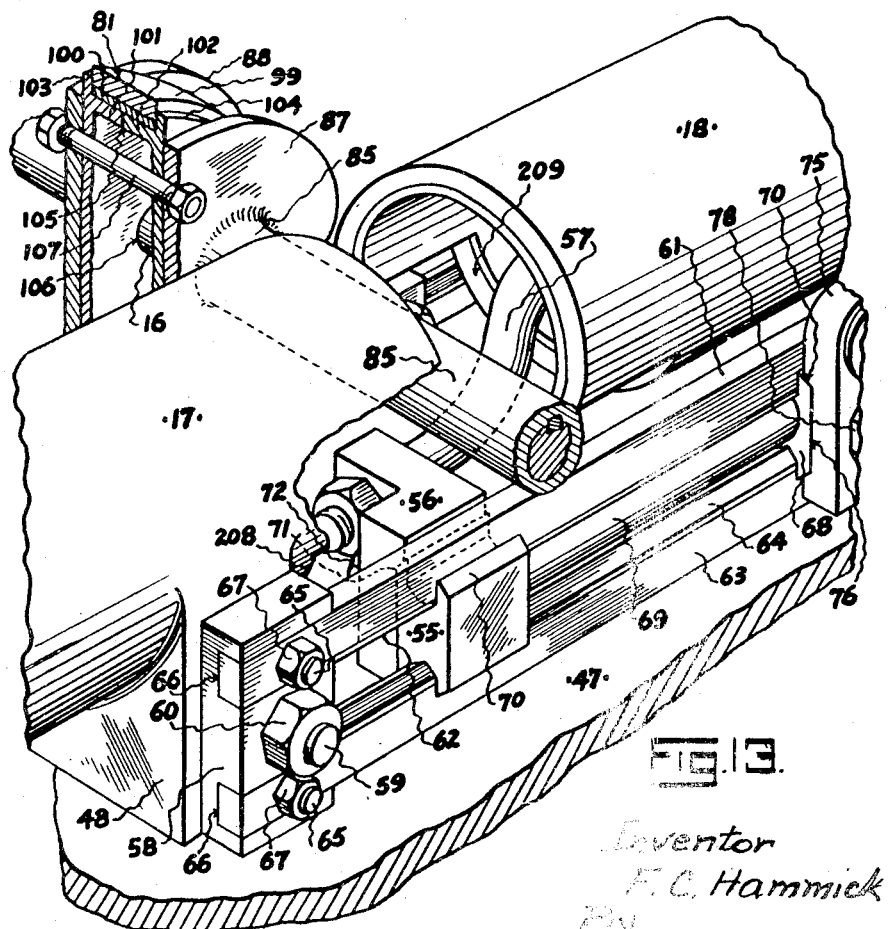
Fig. 13 is a fragmentary perspective view of the inner portions of the opposed cylinders of the engine and mechanism associated therewith.

The particular construction of the eccentrics 81 and 82 which are similar, will be described with reference to Fig. 13 wherein the assembly of eccentric 81 on the output shaft 16 is shown in section.

The hollow big-end boss 99 of the eccentric is provided with a bearing bush 100 and two journal halves 101 and 102 of shallow cylindrical form with one end closed and having peripheral flanges 103 and 104, are fitted in each side of the bushed big-end boss 99 with their inner faces in abutment at 105. A lateral working clearance is provided between the flanges 103 and 104 and the big-end boss 99. The journal halves 101 and 102 are provided with coaxial eccentrically located holes 106 through which the output shaft 16 passes, and are bolted together between the end flange 87 and the eccentric retaining plate 88 by a series of arcuately disposed bolts 107.

The eccentric 82 is similarly provided with two flanged journal halves 108 and 109 (Figs. 10 and 11) which are bolted together between the end flange 86 and the eccentric retaining plate 84 by means of a series of bolts 110.

The outer faces of the journal halves are provided with holes 111 (Fig. 10) to reduce the weight of the eccentrics.

The two stroke pistons 22 and 23 are pivotally connected by gudgeon pins directly to the small ends of eccentrics 112 and 113. The eccentrics 112 and 113 are constructed in a manner similar to that of the eccentrics 81 and 82, being provided with big-end journal halves 114, 115 and 116, 117, and being bolted between flanged sleeves 118, 119 and 120, 121 by a series of bolts 122 and 123 respectively.

The flanged sleeves 118, 119 and 120, 121 are journalled in bushes 124, 125 and 126, 127 secured in crank-cases 128 and 129 which are formed of two halves bolted together and bolted to the outer flanged ends of the cylinders 17 and 18 respectively by bolts 130 and 131. Spacing washers 132 and 133 are provided on the flanged sleeves to limit axial movement of the eccentrics 112 and 113 respectively.

The shafts 24 and 25, which are also in effect torque shafts, are slidably fitted through the flanged sleeves and eccentrics 118, 119, 112 and 120, 121, 113 respectively and each is keyed to its related flanged sleeves to prevent relative rotation.

The shaft 24 passes through a bearing bush 134 secured in a laterally extended portion 135 of the front casing 36 and has a sprocket 136 secured on its outer end between the portion 135 and the front cover plate 37.

A flange 137 integral with the shaft 24, and a cover plate 138 screwed to the outer side of the crankcase 128, restrain the shaft against movement axially.

The shaft 25, which is longer than the shaft 24, passes through a bearing bush 139 secured in a further laterally extended portion 140 of the front casing 36 and has a sprocket 141 secured thereto at its outer end beyond the plane of the sprocket 136 and between the portion 140 and the front cover plate 37. A flange 142 and a cover plate 143 corresponding to 137 and 138 are also provided.

Sprockets 144 and 145 formed on the sprocket sleeve 83 and the sprockets 136 and 141, provide means for operably connecting the shafts 24 and 25 respectively to the output shaft 16 by means of chains 146 and 147 (Fig. 10).

The exhaust ports 26 and 27 are formed through the walls of the cylinders 17 and 18 and their related liners 43 and 44 respectively are provided with fluid communication with the turbine nozzles 28 and 29 by means of exhaust manifolds 150 and 151 each of which is secured at one end to its related cylinders and at the other end to its related turbine nozzle.

The turbine nozzles 28 and 29, of convergent type, extend through holes 152 and 153 in the rear cover plate 41 and although shown in Fig. 11 in the plane of the drawing for simplicity, they, in reality, extend in different directions to tend to cause rotation of the turbine in the one direction, and are disposed to the turbine blades 154 at an angle calculated in known manner to obtain maximum wheel efficiency for given conditions.

The blades 154 of the turbine, which in this particular case is of the simple axial flow impulse type, are provided with a lip 155 on the nozzle side to tend to scavenge residual gas in the two stroke portion of the cylinder and to reduce back pressure on the pistons when the jet velocity is less than that on which maximum wheel efficiency is based. In general the volumetric efficiency may be assumed normal with respect to the swept volume of the four stroke pistons and the horse power rating may be based accordingly on such volume.

Although a simple impulse turbine has been employed in the engine shown in the drawings, it is to be understood that other types of turbine such as a compound or multistage compound turbine may be employed as well as any number of cylinders as before mentioned. The general term turbine, in this specification, shall be interpreted as meaning any known type of turbine unless specifically stated otherwise.

Referring now to Fig. 10, two inlet valve housings 156 and 157 which house the inlet poppet valves 30 and 31, are bolted to the cylinders 17 and 18 respectively, and have their upper ends inclined towards the rear casing 35. An inlet manifold 158 integral with the housings 156 and 157 has a centrally located portion 159 with a flange 160 at its outer end extending towards the front cover plate 37. The flange 160 is located adjacent to a hole in the front cover plate and is adapted to have a carburetor attached thereto.

In this particular engine spark ignition is employed, high tension current being supplied by means of a two-cam magneto 161 which is secured by screws to the top of the front casing 36 and is connected to spark plugs 162 and 163 (Figs. 12 and 11) in the cylinders 17 and 18 by means of high tension leads 164 and 165 respectively.

The arrangement of the inlet valve 30 in the housing 156 and the actuating mechanism associated therewith, is clearly shown in Fig. 12.

A bracket 166 secured to the top of the front casing 36, has a depending boss 167 with a bush 168 therein, in which is rotatably mounted a spindle 169 having a bevel gear 170 secured thereto or integral therewith at its inner end and a sprocket 171 secured thereto at its outer end by means of a key 172 and nut 173.

The sprocket 171 is driven by the chain 146 (Fig. 10) which also passes around the sprockets 136 and 144. The sprockets 171 and 136 each have an effective diameter twice that of the sprocket 144.

The bevel gear 170 meshes with a bevel gear 174 secured to or formed integral with the cam 32 rotatably mounted on a spindle 175 fixedly secured in a boss 176 extending inwardly from a side wall of the rear casing 35.

The cam 32 imparts reciprocatory motion to the valve 30 through a cam follower arm 177 and valve cap 178, the valve being spring biased towards the cam in known manner, for example by means of a set of inner and outer valve springs 179, a retaining cap 180 and split tapered collets 181. The valve 30 reciprocates in a guide 182 fitted in the housing 156 and seats on a valve seat insert 183. A passage 184 is formed through the cylinder 17 and liner 43 to admit the head of the valve and allow the passage of the fuel-air mixture into the cylinder.

The ridge 185 of the deflector crown 34 of the two stroke piston is disposed at right angles to the valve axis. In Fig. 11 the contour of the crown has been shown in the plane of the section for simplicity. The exhaust port manifolds 150 and 151 extend approximately at right angles to the direction of flow of the unburnt mixture into the cylinders to assist in avoiding loss of fuel by reason of the overlap of the inlet and exhaust opening periods, and to tend towards achieving a high volumetric efficiency with respect to the four stroke portion of the cylinder.

Tappet clearance adjustment between the cam follower arm 177 and cam 32 is effected by advancing or withdrawing to or from the cam 32 the cam follower arm, which is tapered. This movement is effected by rotating a spindle 186 (refer also to Fig. 15) which passes through a boss 187 extending inwardly of the rear casing 35 and has an eccentric journal 188 and a retaining flange 189 at its inner end.

The cam follower arm 177 has an enlarged end 190 provided with a bush 191 and is fitted on the eccentric journal and oscillates thereon between the flange 189 and a washer 192. The spindle 186 extends through the casing and has a squared outer end 193 to enable it to be rotated, and a screw thread on which is fitted a washer 194 and locknut 195 which, when tightened, forces the side face of the eccentric against the washer 192 and prevents rotation of the spindle and eccentric. The construction and arrangement of the inlet valve 31, housing 157, two stroke piston 23 and cylinder 18 is similar to that described with reference to the inlet valve 30 in Fig. 12 with the exception that the two stroke piston 23 is disposed opposite to the two stroke piston 22.

A cam follower arm similar to 177 is eccentrically mounted on a spindle 196 (Fig. 9) which passes through a boss 197 (Fig. 10).

A bracket 198 similar to the bracket 166 has a depending boss 199 (Fig. 14) with a bush 200 therein in which is rotatably fitted a spindle 201 having a bevel gear 202 at its inner end and two sprockets 203 and 204 secured thereto at its outer end by means of a key 205 and locknut 206. The sprocket 203 is connected by a chain 207 to a similar sized sprocket 208 secured to the armature shaft 209 of the magneto 161.

The sprocket 204 is driven by the chain 147 which also passes around the sprockets 145 and 141. The effective diameter of each of the sprockets 204 and 141 is twice that of the sprocket 145.

The bevel gear 202 transmits rotary motion to the cam 33 through bevel gear 210 which is secured to or formed integral with the cam 33 and is rotatably mounted on a spindle 211 which passes through a boss 212 and the wall of the rear casing 35 and is secured therein by means of a flange 213, formed integral with the spindle 211, and a locknut 214 screwed on the spindle outside the casing. A washer 215 and locknut 216 is provided on the inner end of the spindle 211.

The valve 31 is spring biased towards the cam 33 by a set of inner and outer valve springs 217 (Fig. 10).

The chains 146 and 147 are preferably tensioned by chain tensioners in known manner.

The use of cross-heads instead of direct couplings to the pistons 19 and 20 by cranks or eccentrics on the output shaft 16, enables the width of the engine to be reduced to a minimum.

To assist in the reduction of width of the engine, the cylinders 17 and 18 have lower inner end portions cut away at 208 and 209 (Fig. 13) to permit the piston rods 54 and 57 and blocks 53 and 56 to freely traverse their reciprocatory strokes beneath the connecting sleeve 85 which intersects the axis of the cylinders. The skirts of the pistons 19 and 20 are also formed to clear the reciprocating parts.

When the engine is running, surplus lubricant fed to the various mechanisms falls, due to gravity, onto the bottom 47 of the front casing 36 (Fig. 12) and then through the passage 218 between the side walls of the rear casing 35, and/or directly through the passage 218 and into the sump housing 39.

Figure 16:
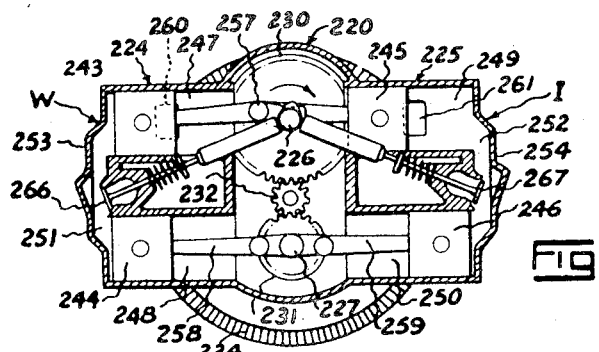
Figs. 16, 16A, 16B and 16C are diagramatic representations of a second embodiment, in the form of a twin opposed parallel cylinder engine, showing the cycle of events in four stages.
Figure 16A:
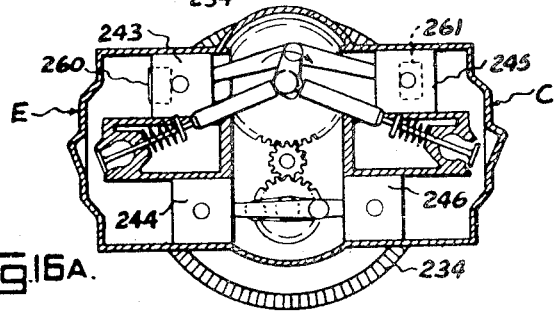
Figure 16B:
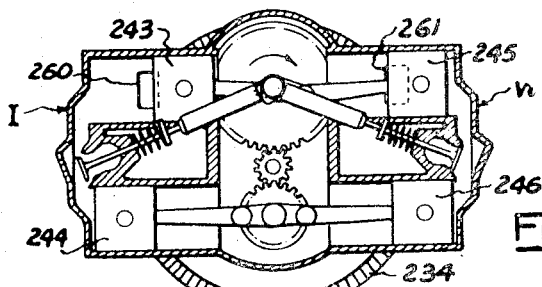
Figure 16C:
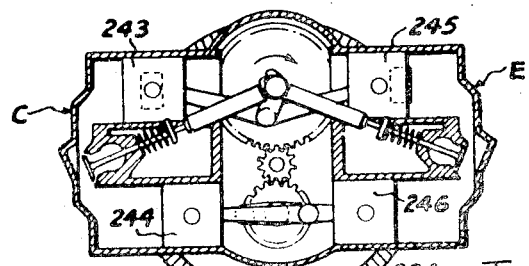

Referring now to Figs. 16 to 20, which depict a second embodiment in the form of a twin opposed parallel cylinder engine, like reference numerals will be employed to indicate corresponding parts in the diagrammatic representations of Figs. 16 to 16C and in the practical construction shown in Figs. 17 to 20.

In this construction the swept volumes of the two and four stroke pistons are made equal as shown in Fig. 5 to which reference will also be made.

Figs. 16 to 16C show the cycle of events in four stages in a manner similar to that of Figs. 1 to 1C.

A crankcase 220 having an integral rear wall 221, a front cover plate 222 and a rear cover plate 223 secured thereto, has two cylinder blocks 224 and 225 secured thereto on opposite sides thereof.

A two stroke crankshaft 226 and a four stroke crankshaft 227 extend between and are journalled one above the other in parallel disposition in the rear wall 221 and the front cover plate 222 and extend through bearings 228 and 229 respectively in the rear cover plate 223.

The two stroke crankshaft is operably connected to the four stroke crankshaft at 2:1 reduction by gears 230 and 231 through an idler gear 232 integral with or secured to a shaft 233, of a two-stage turbine 234, mounted in bearing races 235 and 236 located respectively in the front cover plate 222 and an outer cover plate 237 of the turbine housing 238 which is secured to the cover plate 222. Two turbine wheels 239 and 240 are secured together and keyed to the shaft 233 and have their blades located on either side of a ring of fixed blades 241 extending from the casing 238. Turbine outlet ducts 242 are provided around the outer cover plate 237. A scavenging lip 155A is provided at the leading edge of each blade of the turbine wheel 239.

The cylinder blocks 224 and 225 carry corresponding two and four stroke pistons 243 and 244, and 245 and 246 respectively in adjacent cylinders 247, 248, and 249, 250, the cylinders of each pair being disposed parallel to each other and being fluid connected by common combustion chambers 251 and 252 provided by common cylinder heads 253 and 254.

Connecting rods 255 and 256 of the two stroke pistons 243 and 245 are mounted adjacent to each other on a common crank 257 of the crankshaft 226, while connecting rods 258 and 259 of the four stroke pistons 244 and 246 are mounted respectively on cranks 260 and 261, of the crankshaft 227, and are displaced 180° relative to each other, so that combustion takes place alternately in the combustion chambers every revolution of the four stroke crankshaft which constitutes the output shaft.

Exhaust ports 260 and 261 are provided in the two stroke cylinders and communicate with the turbine by means of convergent nozzles 262 and 263 respectively which direct the exhaust gases to the blades of the turbine wheel in known manner. Gland nuts 264 and 265 are provided to secure the nozzles in spigots extending from the cover plate 222 and to provide a seal.

Inlet valves 266 and 267, of conventional poppet type, for the combustion chambers 251 and 252, are actuated through cylindrical cam followers 268 and 269 by cams 270 and 271 respectively which are secured on the two stroke crankshaft 226.

The lines of action of the inlet valves are inclined towards the respective four stroke cylinders and the cylinder heads are shaped accordingly to receive the valve heads and to direct the induced charges of air or air-fuel mixture substantially into the four stroke cylinders 248 and 250.

Owing to the relative disposition of the cams and the cylinders, the axes of which pass through the centre planes of the respective cranks, the axes of the valves are not located in the respective planes of rotation of the cams.

Figure 19:
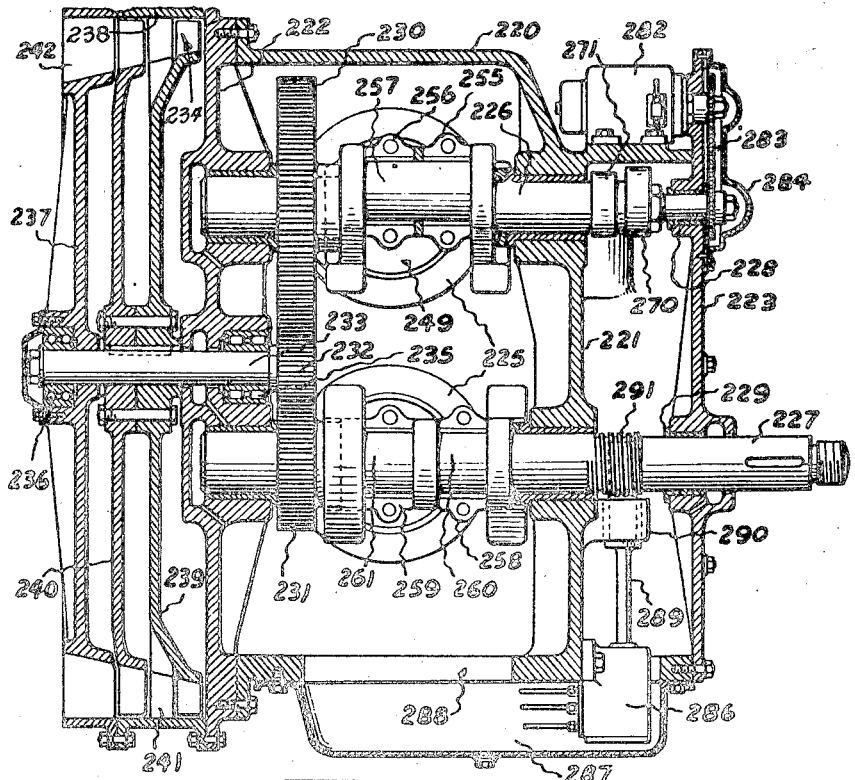
Fig. 19 is a sectional elevation on the line 19—19 of Fig. 17.
Figure 20:
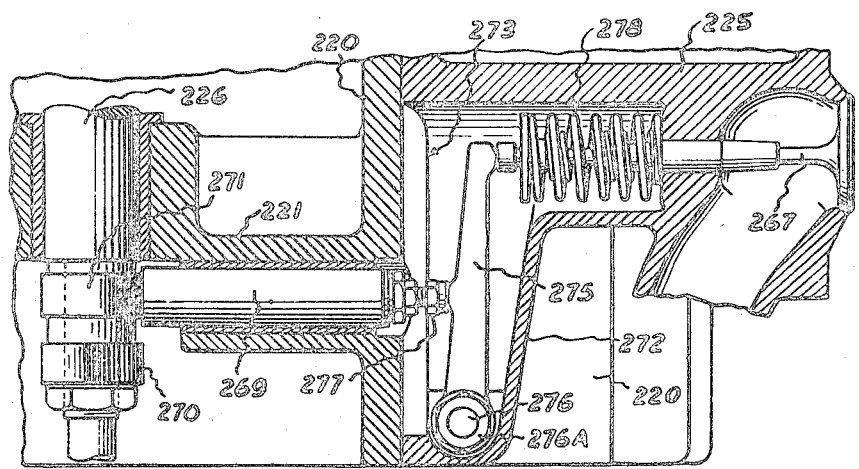
Fig. 20 is an enlarged fragmentary elevation of valve operating mechanism on the line 20—20 of Fig. 17.

Means employed to overcome this valve offset are shown in Figs. 19 and 20 with respect to the cylinder block 225.

The cylinder block 225 is provided with an integral housing 272 extending outwardly of one side thereof and at an angle to the axes of the cylinders. The housing is apertured at 273 at the base of the cylinder block to facilitate assembly and is provided with a detachable cover plate 274 secured thereto by screws or the like.

A follower arm 275 is pivoted on a pin 276 secured in the housing at its outer end and is held thereon by a nut 276A.

A tappet adjusting screw 277 secured in the outer end of the cam follower 269 bears against the follower arm between its ends while the outer end of the follower arm actuates the valve 267 against the return springs 278.

Similarly the valve 266 in the cylinder block 224 is actuated by the cam 270 and by means of the cam follower 268, a tappet adjusting screw 279, and follower arm 280 as shown in Fig. 18 in which a detachable cover plate 281 is shown with a portion thereof removed.

Ignition means may be of any known type, for example spark or compression ignition. In the embodiment shown, a magneto 282 is mounted on the crankcase 220 and driven from the two stroke crankshaft by chain and sprocket transmission 283 which is enclosed by a cover 284 secured by screws to the outer face of the cover plate 223. Gears may be substituted for the chain and sprocket if desired.

A fuel injection pump in the case of compression ignition is similarly mounted and driven. A screwed hole 285 (Fig. 17) is provided in each cylinder head to receive either a spark plug or fuel injection nozzle.

Lubrication of the cylinders and bearings is provided in known manner by means of a pump 286 which is secured to the crankcase and extends through an aperture therein into a sump 287. A further drain aperture 288 is provided in the base of the crankcase below the cranks. The pump is driven, for example, by a worm wheel spindle 289 which is journaled in an extension 290 of the crankcase and engages in a worm 291 on the crankshaft 227.

The construction above described is basically the same as that described with reference to Figs. 1 to 15. The arrangement of the two and four stroke pistons in parallel cylinders with a common combustion chamber, however, provides for high volumetric efficiency in the four stroke cylinder, and for more effective scavenging of the two stroke cylinder due to the shape of the combustion chamber which is in the form of a narrow transfer passage connecting the two and four stroke cylinders. Such transfer passage also aids turbulation and atomisation of the fuel.

Although the timing shown in Fig. 3 may be equally applied to this second embodiment, its timing and operation may be varied, for example, as that depicted in Fig. 5 to which reference will now be made.

Owing to the large volume $V_4$ of residual gas in the two stroke cylinder which is brought about by providing only a small advance of the two stroke pistons, in this case 30°, greater reliance is placed on scavenging to effect a high expansion-induction ratio. For this purpose the velocity ratio of the gears 232 and 231 is 2 so that the turbine rotates at twice the speed of the crankshaft 227, the blade velocity being greater than the maximum piston velocity. The major portion of the work output is effected by pressure energy, the exhaust port being exposed close to the end of the expansion stroke at a point $\frac{3}{4}S_2$.

A further heat drop then takes place through the nozzles and additional work is done on the turbine until the pressure drop reduces the gas velocity to such a value that the work done on the turbine changes from positive to negative and scavenging begins. It is estimated that scavenging of the two stroke cylinder to a pressure of approximately one half of an atmosphere will be effected. This means that $V_2$ is reduced to $V_y$ on the scavenging curve Z, $V_y$ comprising $V_s$ which represents the induced volume in the four stroke cylinder and $V_R$ which represents the volume of residual gas remaining in the two stroke cylinder at the temperature and pressure corresponding to $V_y$. The ratio of expansion to induction $\omega$ is then given by $$\frac{V_3}{V_y}$$

and the compression ratio is given by $$\frac{V_y}{V_1}$$

In addition to scavenging the turbine also functions in some degree as a supercharger on the exhaust side of the engine, the extent of the supercharging depending on the degree of scavenging and the cross sectional area of the transfer passage formed by the combustion chamber between the two and four stroke cylinders.

The timing arrangements described above have been given as preferred examples only, the combination of two and four stroke pistons with a common combustion chamber, and a turbine provides the basis upon which a diversity of timing arrangements may be employed to utilise the heat energy of the fuel in doing useful work.

It is to be understood that the invention is in no way limited to the particular constructions described herein which are given by way of example, it being obvious to those skilled in the art that the various specific constructions of engine falling within the scope of the invention, as ascertained earlier in the specification and fundamentally the same as that shown, are practically unlimited. The admission of fuel and means of ignition may be of any known form. Thus the cycles upon which the functioning of an engine according to the present invention is based, may take the form of the Otto cycle, or the Diesel cycle, or the semi-Diesel cycle each modified by constant pressure cooling taking place after constant volume cooling and before compression.

I claim:

1. In an internal combustion engine, means for expanding the working substance to a volume greater than the volume induced comprising two pistons, cylinder means housing said pistons and providing a combustion chamber in fluid communication with both said pistons, transmission means operably connecting together said pistons for relative reciprocation in the ratio of two strokes of one piston to four strokes of the other piston, means directing the induced working substance into a part of said cylinder means and rotary blade means for scavenging residual gases from another part of said cylinder means.

2. In an internal combustion engine, means for expanding the working substance to a volume greater than the volume induced comprising two pistons, cylinder means housing said pistons and providing a combustion chamber in fluid communication with both said pistons, transmission means operably connecting together said pistons for relative reciprocation in said cylinder means in the ratio of two strokes of one piston to four strokes of the other piston, means including an inlet valve directing the induced working substance into a part of said cylinder means, an exhaust port located in another part of said cylinder means and controlled by the two stroke piston, and rotary blade means driven by said transmission means for scavenging residual gases through said exhaust port.

3. An internal combustion engine adapted to expand the working substance to a volume greater than the volume induced comprising a cylinder, two opposed pistons in said cylinder, two crankshafts disposed at opposite ends of the cylinder and each connected to one of said pistons, transmission means connecting said crankshafts together in the ratio of two to one whereby one piston reciprocates two strokes to every four strokes reciprocation of the other piston, an inlet valve in said cylinder between said pistons, a deflector on the two stroke piston for directing an induced charge towards the four stroke piston, an exhaust port in the cylinder controlled by a piston valve comprising the two stroke piston, an exhaust manifold providing an outlet from the exhaust port to atmosphere, and a scavenging fan in said manifold for reducing the quantity of residual gases in the cylinder, said fan being connected by transmission means to said crankshafts and said crankshafts being timed to rotate relative to each other such that on the expansion stroke both pistons move towards their outer dead centre positions and on the induction stroke the two stroke piston moves towards its inner dead centre position and the four stroke piston moves towards its outer dead centre position.

4. An internal combustion engine having a swept volume on the expansion stroke greater than the swept volume on the induction stroke comprising two cylinders having an interconnecting passage constituting a common combustion chamber at one end of the cylinders, two parallel crankshafts at the other end of the cylinders connected together by transmission means for relative rotation in the ratio of two to one, a piston connected to a crank of each crankshaft for reciprocation in a respective cylinder in the order of two strokes of one piston to four strokes of the other piston, an inlet valve in the combustion chamber disposed to direct an induced charge towards the cylinder housing the four stroke piston, piston exhaust valve means comprising the two stroke piston and a port in the cylinder housing said two stroke piston, an exhaust manifold housing leading from the exhaust port to atmosphere, a scavenging fan rotatably mounted in the exhaust manifold housing, and transmission means connecting said fan to, so as to be driven by, said crankshafts to reduce the quantity of residual gas in the cylinder housing the two stroke piston.

5. An internal combustion engine adapted to expand the working substance to a volume greater than the volume induced comprising two stroke and four stroke pistons adapted to reciprocate in parallel cylinders and connected to respective parallel crankshafts which are geared together in the ratio of two to one, a transfer passage connecting the cylinders of each pair of two and four stroke pistons at their inner dead centre ends, ignition means in the transfer passage, inlet means directing the induced charge towards the cylinder of the four stroke piston, and exhaust means comprising an exhaust port in the cylinder of the two stroke piston which port is uncovered by the two stroke piston during its travel to its outer dead centre position, said crankshafts being timed for relative rotation by said transmission means such that the two stroke piston leads the four stroke piston.

6. An internal combustion engine as claimed in claim 5 including an exhaust manifold housing and a scavenging fan rotatably mounted in said housing and driven by said crankshafts to expel residual gases from the two stroke cylinder to atmosphere.

FREDERICK CHARLES HAMMICK.

REFERENCES CITED

The following references are of record in the file of this patent:

UNITED STATES PATENTS

| Number | Name | Date |
|---|---|---|
| 1,237,696 | Rayl | Aug. 21, 1917 |
| 1,263,972 | Warner | Apr. 23, 1918 |
| 1,781,008 | Greening et al. | Nov. 11, 1930 |
| 2,117,700 | Burkhardt | May 17, 1938 |
| 2,336,786 | Gunst | Dec. 14, 1943 |
| 2,345,056 | Mallory | Mar. 28, 1944 |
| 2,354,620 | Smith | July 25, 1944 |
| 2,359,045 | Markwalder | Sept. 26, 1944 |
| 2,456,164 | Youhouse | Dec. 14, 1948 |

FOREIGN PATENTS

| Number | Country | Date |
|---|---|---|
| 216,209 | Great Britain | 1924 |